M. YOUNG.
RESILIENT WHEEL.
APPLICATION FILED AUG. 17, 1912.
1,071,288.
Patented Aug. 26, 1913.
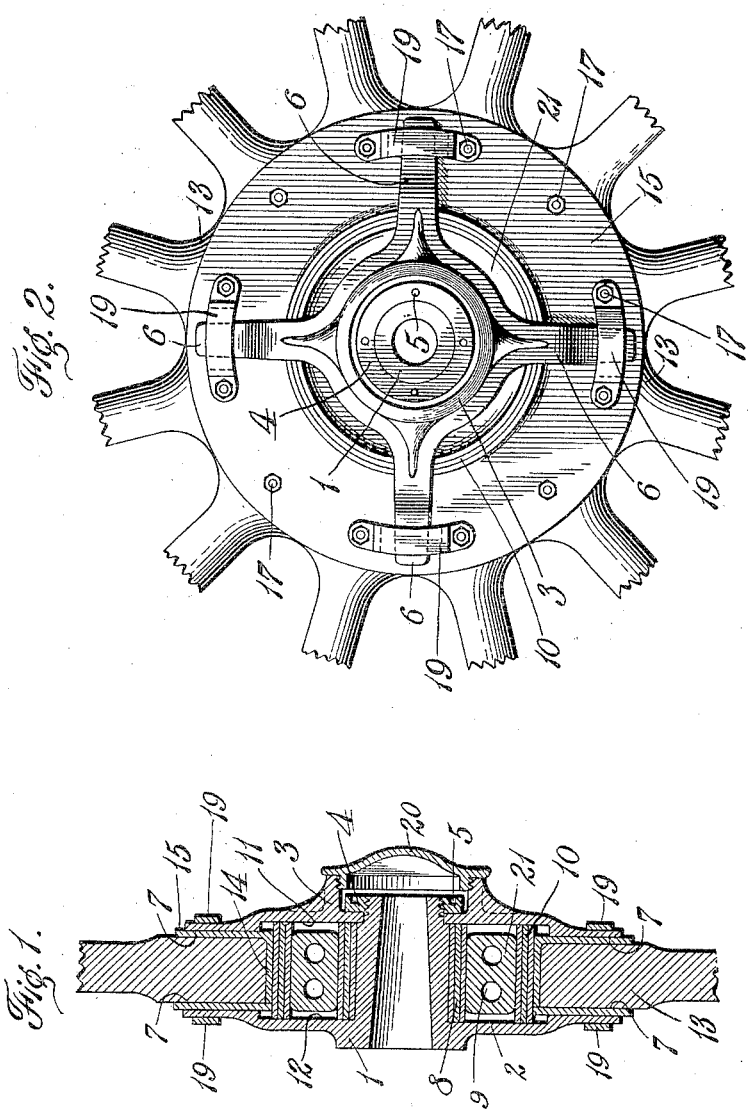
Witnesses
Chas. W. Stauffiger
A. M. Dorr
Inventor
Marcus Young,
By
Attorneys

UNITED STATES PATENT OFFICE.

MARCUS YOUNG, OF PORT HURON, MICHIGAN.

RESILIENT WHEEL.

1,071,288.   Specification of Letters Patent.   Patented Aug. 26, 1913.

Application filed August 17, 1912. Serial No. 715,537.

*To all whom it may concern:*

Be it known that I, MARCUS YOUNG, a citizen of the United States of America, residing at Port Huron, in the county of St. Clair and State of Michigan, have invented certain new and useful Improvements in Resilient Wheels, of which the following is a specification, reference being had therein to the accompanying drawings.

This invention relates to vehicle wheels and to an arrangement thereof whereby they yield resiliently under load and whereby a simple, rigid and inexpensive construction is obtained.

The invention consists in the matters hereinafter set forth, and more particularly pointed out in the appended claims.

In the drawings, Figure 1 is a view in section through the center portions of a wheel that embodies features of the invention; Fig. 2 is an end view thereof with the dust cap removed.

As herein shown, a hub 1 of standard internal construction has radial arms 2 extending from the inner portion thereof. A spider 3 is secured on the outer end portion of the hub as by a check nut 4 or collar fitted with suitable spanner holes 5 or otherwise adapted for the application of a turning tool. Arms 6 on the spider are in register with the corresponding arms 2 on the rear of the hub and the outer portions of both sets of arms have inner parallel guide faces 7.

A series of friction sleeves 8 are concentrically secured on the cylindrical barrel of the hub between the spider 3 and the arms 2. These sleeves are adjusted so as to have sliding frictional engagement with each other and the hub. A resilient annular cushion 21 encircles the friction sleeves and closely grips the outer one. This cushion may be solid or may have an air chamber or chambers 9 of any preferred cross sectional form. Outer friction bands 10 of spring steel or similar material concentrically secured surround the cushion 8, the inner one preferably closely gripping the latter and the outer bands having frictional sliding engagement on each other and the inner one. Endwise movement of the bands and of the sleeves is prevented by the inner faces 11 of the spider 6 and corresponding faces 12 of the spider arms 2. The inner end portions 13 of wheel spokes of conventional type are secured around a floating ring of channel form into which the ends are thrust in the usual manner. As herein indicated the hub ring consists of a member 14 having a flange 15, and a clamping band 16 secured against the applied spokes and to the flange 15 by suitably disposed bolts 17 or the like. This floating hub or channel ring is adjusted to have sliding engagement between the guide faces 7 of the spider arm and is in frictional rotatable engagement with the outer one of the bands 10. To limit the rotary movement of the floating hub, suitable stops are used against which the spider arms may bear. Preferably these stops consist of straps 19 bridging the arms and secured by the bolts 17 against the outer sides of the floating hub. A dust cap 20 closes the opening of the spider 3 and shields the bur of any skein to which the rim is applied. As a result of this construction the floating hub is free to oscillate on the cushion, while driving torsion applied to the hub is communicated to the wheel proper through the friction sleeves and bands, the latter being so adjusted as to only rotate under excessive driving strain. Such strain when it has slipped the parts brings the spider stops into play so that the latter form a positive lock against further rotation.

When the wheel is started on the road, the friction bands and sleeves slip on each other in the manner of stacks of sheets, the outer ones moving farthest and the inner ones moving least. When the wheel is arrested, a reverse motion occurs between the several sleeves and bands. As the co-efficient of friction between the several sleeves and the several bands is greater than the coefficient of friction between the rubber cushion and the encircling sleeve and band, there is no creeping between the cushion and the sleeves and bands and therefore no heating or wearing of the cushion proper.

Obviously, changes in the details of construction may be made without departing from the spirit of the invention and I do not care to limit myself to any particular form or arrangement of parts.

I claim:—

1. In a vehicle wheel, a hub provided with lateral arms, a spider on the hub having arms in spaced relation to the hub arms, a set of friction sleeves in frictional concentric engagement with each other between the hub and the spider arms, a resilient annulus encircling the friction sleeves, a set of friction bands in frictional concentric engagement around the annulus, a hub ring in frictional engagement with the bands and sliding engagement with the proximate faces of the hub and spider arms, and wheel spokes mounted in the hub ring.

2. In a vehicle wheel, a hub, radial arms extending from one end of the hub, a spider removably secured on the other end, arms on the spider corresponding to the hub arms, friction sleeves in frictional rotatable engagement with the hub barrel between the spider and the hub arms, a resilient annulus encircling the sleeves, friction bands concentrically secured in frictional engagement with each other around the annulus, a hub ring in rotatable frictional engagement with the bands and sliding engagement with the proximate faces of the hub and spider arms, and wheel spokes secured in the hub ring.

3. In a vehicle wheel, a hub, radial arms near one end thereof, a spider movably secured to the other end thereof, arms on the spider having inner guide faces in parallel spaced relation to corresponding faces on the hub arms, friction sleeves concentrically secured in frictional engagement with each other and the barrel of the hub between the hub arms and the spider, a resilient annulus concentrically gripping the outer friction sleeve, friction bands concentrically mounted on the annulus in rotatable frictional engagement with each other, a floating hub ring in rotatable frictional engagement with the outer friction band and in sliding engagement with the guide faces of the arms of the hub and spider, means on the hub ring for limiting the relative annular movement of the ring and hub and spokes secured on the floating hub ring.

4. In a vehicle wheel, a hub, radial arms near one end thereof, a spider movably secured to the other end thereof, arms on the spider having inner guide faces in parallel spaced relation to corresponding faces on the hub arms, friction sleeves concentrically secured in frictional engagement with each other and the barrel of the hub between the hub arms and the spider, a resilient annulus concentrically gripping the outer friction sleeve, friction bands concentrically mounted on the annulus in rotatable frictional engagement with each other, a floating hub ring in rotatable frictional engagement with the outer friction band and in sliding engagement with the guide faces of the arms of the hub and spider, means on the hub ring for limiting the relative annular movement of the ring and hub, and spokes secured on the floating hub ring, the arms of the hub and spider bearing against the end faces of the friction sleeves and friction bands.

In testimony whereof I affix my signature in presence of two witnesses.

MARCUS YOUNG.

Witnesses:
ANNA M. DORR,
OTTO F. BARTHEL.

---

Copies of this patent may be obtained for five cents each, by addressing the "Commissioner of Patents, Washington, D. C."